US010887838B1

(12) United States Patent
Alexander et al.

(10) Patent No.: US 10,887,838 B1
(45) Date of Patent: Jan. 5, 2021

(54) DIGITAL MOBILE RADIO DENIAL OF SERVICE TECHNIQUES

(71) Applicant: BAE Systems Information and Electronic Systems Integration Inc., Nashua, NH (US)

(72) Inventors: William H. Alexander, Merrimack, NH (US); Ryan E. Long, Epsom, NH (US); Joshua L. Petersen, Mont Vernon, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/278,649

(22) Filed: Feb. 18, 2019

(51) Int. Cl.
*H04W 52/02* (2009.01)
*H04W 8/22* (2009.01)
*H04K 3/00* (2006.01)
*H04L 1/16* (2006.01)

(52) U.S. Cl.
CPC .......... *H04W 52/0235* (2013.01); *H04K 3/45* (2013.01); *H04L 1/1607* (2013.01); *H04W 8/22* (2013.01); *H04W 52/0222* (2013.01); *H04W 52/0274* (2013.01)

(58) Field of Classification Search
CPC ............... H04W 52/0235; H04W 8/22; H04W 52/0222; H04W 52/0274; H04W 12/02; H04W 4/10; H04W 24/08; H04W 88/023; H04K 3/45; H04L 1/1607; H04B 17/30; G10L 15/265
See application file for complete search history.

(56) References Cited

U.S. PATENT DOCUMENTS

| 10,652,735 | B2* | 5/2020 | Li | G06Q 20/325 |
| 2014/0073291 | A1* | 3/2014 | Hildner | H04L 63/30 455/411 |
| 2014/0215611 | A1* | 7/2014 | Kim | H04L 63/1416 726/22 |
| 2016/0323299 | A1* | 11/2016 | Huston, III | H04L 63/1416 |

(Continued)

OTHER PUBLICATIONS

BAE Systems Information and Electronic Systems Integration Inc., U.S. Appl. No. 16/356,353, filed Mar. 18, 2019 for "Digital Mobile Radio Device Page Technique", 32 pages.

(Continued)

*Primary Examiner* — Khawar Iqbal
(74) *Attorney, Agent, or Firm* — Finch & Maloney PLLC; Scott J. Asmus

(57) ABSTRACT

A system for transmitting a DMR disable signal to a target mobile radio device is provided. The system includes an antenna configured to transmit and receive messages and a base station comprising at least one computing device communicatively coupled to the antenna. The at least one computing device is configured to generate a first message to be transmitted to a target mobile radio device, the first message comprising a disable signal selected from a list of non-standard operational parameters that can be implemented by the target mobile radio device, cause transmission of the first message via the antenna to the target mobile radio device, and monitor incoming messages received via the antenna for an acknowledgement message from the target mobile radio device that the target mobile radio device has been disabled.

21 Claims, 6 Drawing Sheets

(56) References Cited

U.S. PATENT DOCUMENTS

| | | | |
|---|---|---|---|
| 2017/0034307 A1* | 2/2017 | Singh | H04L 67/303 |
| 2017/0353308 A1* | 12/2017 | Reitsma | H04L 9/0866 |
| 2017/0366575 A1* | 12/2017 | Polepalli | H04L 63/1458 |
| 2017/0366601 A1* | 12/2017 | Rodrigues | H04L 12/6418 |
| 2018/0007548 A1* | 1/2018 | Jover | H04K 3/25 |
| 2018/0295101 A1* | 10/2018 | Gehrmann | H04L 63/0263 |
| 2019/0007447 A1* | 1/2019 | Barnes | H04L 41/12 |
| 2019/0058810 A1* | 2/2019 | Valverde | H04N 1/32112 |
| 2019/0222569 A1* | 7/2019 | Willis | H04L 63/0823 |
| 2019/0387021 A1* | 12/2019 | Wyatt | H04L 63/1466 |
| 2020/0007276 A1* | 1/2020 | Kholaif | H04L 43/0823 |
| 2020/0106605 A1* | 4/2020 | Mord | H04L 9/3297 |
| 2020/0153858 A1* | 5/2020 | Nenov | H04L 63/20 |
| 2020/0294636 A1* | 9/2020 | Ansari | H04L 63/0876 |

OTHER PUBLICATIONS

BAE Systems Information and Electronic Systems Integration Inc., U.S. Appl. No. 16/354,876, filed Mar. 15, 2019 for "Digital Mobile Radio Remote Monitoring Technique", 34 pages.

\* cited by examiner

| DMR Control Signaling Block | |
|---|---|
| Information Element | Length (Bits) |
| Last Block | 1 |
| Protect Flag | 1 |
| OpCode | 6 |
| Feature ID | 8 |
| Reserved | 8 |
| Technique | 8 |
| Source ID | 24 |
| Target ID | 24 |

DIGITAL MOBILE RADIO DENIAL OF SERVICE TECHNIQUES

FIELD OF THE DISCLOSURE

This disclosure relates to digital mobile radio communications, and more specifically to denying service to individual digital mobile radio devices.

BACKGROUND

In strategic radio communications, there is often a need to prevent one or more radio devices from properly transmitting and/or receiving radio messages. In some environments, such as a warzone, it can be advantageous to block adversarial radio communications. For example, jamming techniques can be used to interfere with radio communications. Conventional jamming techniques include methods such as transmitting high power noise waveforms to prevent radio communications. A jamming device can require a minimum of about 6 decibels of jam-to-signal ratio. This is partly due to the fact that the target radio device is designed to reject interference and provide gain to received radio waveforms that match a target configuration. One drawback to using noise jamming is unintentional or unavoidable fratricide. As the noise signal is broadcast to the target radio devices, the noise signal can also interfere with friendly radio communications, thereby impacting the quality or reliability of both friendly and adversarial radio communications.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples and are incorporated in and constitute a part of this specification but are not intended to limit the scope of the disclosure. The drawings, together with the remainder of the specification, serve to explain principles and operations of the described and claimed aspects and examples. For purposes of clarity, not every component may be labeled in every figure.

DETAILED DESCRIPTION

Figure 1:
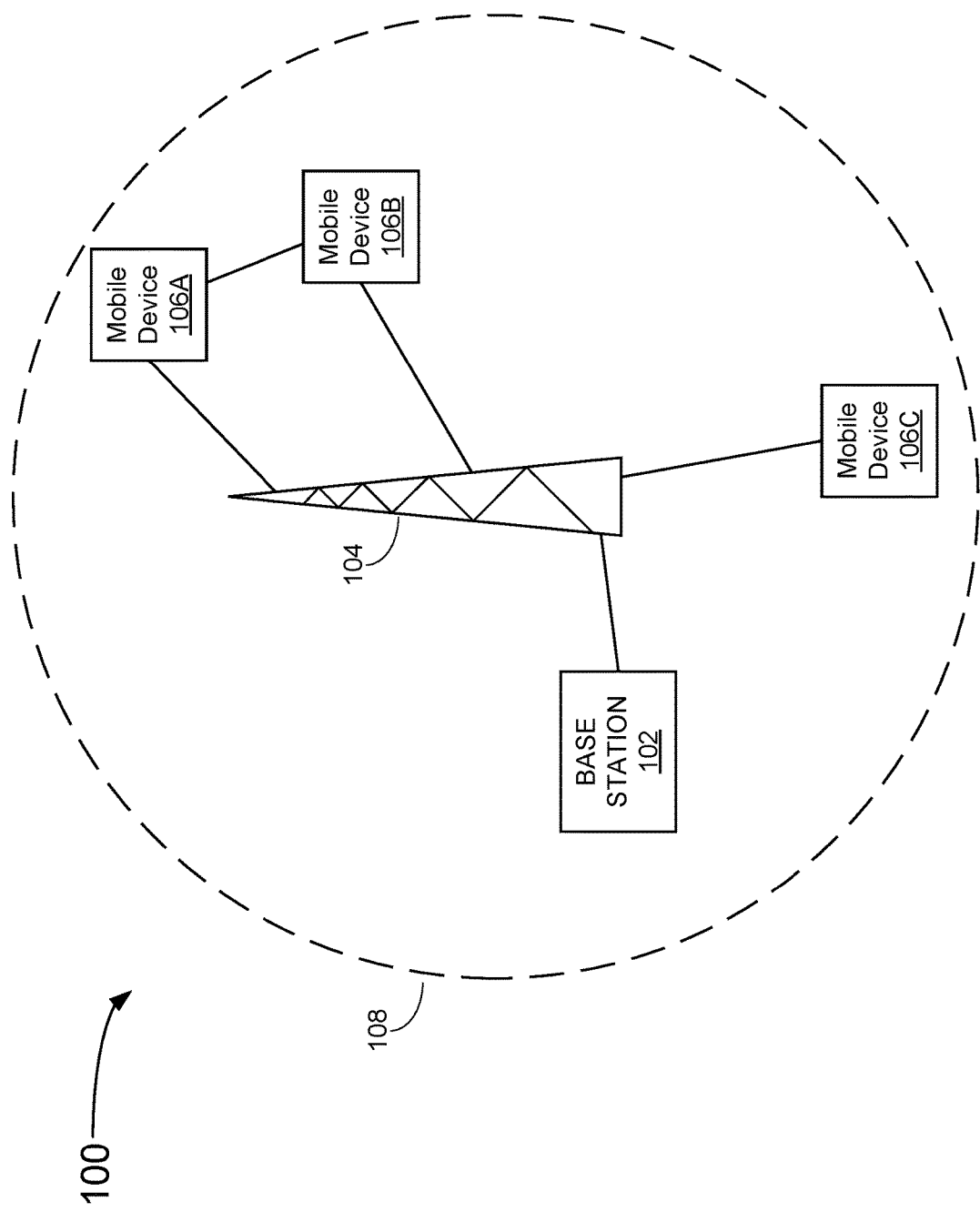
FIG. 1 depicts an example radio communications network, according to an embodiment of the present disclosure.

Techniques are provided for use in a digital mobile radio (DMR) communications network for targeting one or more individual devices and implementing a denial of service (DOS) attack on those communication devices. The DOS attack can be implemented, for example, by exploiting DMR communications to remotely disable the target communication devices. In an embodiment, a system for transmitting a DMR disable signal to a target mobile radio device is provided. The system includes an antenna configured to transmit and receive messages and a base station comprising at least one computing device communicatively coupled to the antenna. The at least one computing device is configured to generate a first message to be transmitted to a target mobile radio device, the first message comprising a disable signal selected from a list of non-standard operational parameters that can be implemented by the target mobile radio device, cause transmission of the first message via the antenna to the target mobile radio device, and monitor incoming messages received via the antenna for an acknowledgement message from the target mobile radio device that the target mobile radio device has been disabled.

General Overview

DMR communication devices have a number of advantages over other digital public or land mobile radio technologies targeted at the business critical and commercial sectors. As a result, DMR communication systems have gained popularity amongst various sectors such as law enforcement and the military where clear and reliable communications are necessary. In addition to being able to match or better existing features of analog radios, DMR incorporates the use of a two-slot time division multiple access (TDMA) protocol which results in DMR providing for simple and effective scalability, energy efficiency, cost efficiency, and new features not possible with analog radios. DMR also provides added range and audio clarity benefits of digital communication. Various portions of DMR communications are outlined, for example, by the European Telecommunications Standards Institute (ETSI) standard TS 102 361 parts 1-4. In the standard, various protocol messages and packet information is defined. However, in addition to the protocol messages as defined in the standard, provisions are available for equipment manufacturers to insert non-standard messages to enable or activate certain manufacturer or device-specific features. The operational codes and data fields used to accomplish this are not generally publicly available but can be reversed engineered or discovered through a set of trial-and-error experiments. Typically, manufacturers program their non-standard message operational codes and data fields into their device firmware. However, to ensure interoperability between manufacturers, other device manufacturers can include those same non-standard message operational codes and data fields into their firmware or they can license firmware from a manufacturer that includes the non-standards message operational codes and data fields. Thus, a large percentage of all DMR communication devices include the ability to recognize and process the non-standard messages. One specific non-standard operational code includes the ability to remotely disable and enable a target device. As will be appreciated in light of this disclosure, this remote disable feature provides an effective low power DOS technique that can target individual adversarial devices as compared to broadcasting a noise signal which can result in unwanted disruptions to friendly communications.

System and Device Architecture

FIG. 1 illustrates an example DMR communication system 100. In certain implementations, the system 100 can include a base station 102 that is includes one or more computing devices that are configured to generate and transmit messages to one or more target mobile devices via an antenna such as antenna 104. For example, the antenna 104 can be configured to broadcast messages over a certain minimum distance that can be rated according to the antenna's power. As shown in FIG. 1, the base station 102 may be positioned near the antenna 104. However, this is shown by way of example only and the base station 102 can be positioned at a remote location away from the antenna 104. For example, antenna 104 may be a mobile antenna that can be quickly assembled and disassembled in an area of interest such as within or adjacent to an area of military fighting. The base station 102 can be positioned at an area away from the antenna 104, for example, at a military base or another central location where planning operations may be performed. The base station 102 can be operably coupled to the antenna 104 via a wired or wireless connection for relaying of messages from the base station to the antenna for transmission.

As further shown in FIG. 1, a set of mobile devices 106A-106C can be configured to receive wireless messages from the antenna 104. Depending upon the configuration of system 100, the mobile devices 106A-106C can be configured to monitor a specific channel or frequency for messages broadcast by antenna 104. For example, the antenna 104 can be configured to broadcast a message at about 512 MHz. In such an example, each of the mobile devices 106A-106C can be configured to monitor 512 MHz for any transmissions from the antenna 104. In other examples, the antenna 104 can be configured to broadcast messages from about 136 MHz to about 860 MHz. In such examples, the mobile devices 106A-106C can be programmed to monitor an appropriate frequency.

As also shown in FIG. 1, the system 100 can have a broadcast distance or signal range 108 that messages from antenna 104 can be received. It should be noted that range 108 is shown as a circle by way of example only. Various factors such as topography and placement of antenna 104 can impact the size and shape of the range 108. For example, in ideal conditions, the antenna 104 may be configured to broadcast over a range 108 having a radius of one mile. However, due to topography changes and other similar factors, the actual distance of range 108 can be less than 1 mile from the antenna 104. Additionally, in some implementations, the antenna 104 can be a directional antenna configured to broadcast in a particular direction. In such an example, the shape of the range 108 can be a semi-circle or a cone radiating from the antenna 104.

In some examples, depending upon the design and functionality of the mobile devices 106A-106C, the mobile devices can be configured to communicate directly with one another. For example, as shown in FIG. 1, mobile device 106A and mobile device 106B can be configured to directly communicate. However, it should be noted that various factors such as the distance between the mobile devices can impact their ability to communicate directly. For example, as shown in FIG. 1, mobile device 106A and mobile device 106C may be physically too far apart to communicate directly.

Figure 2:
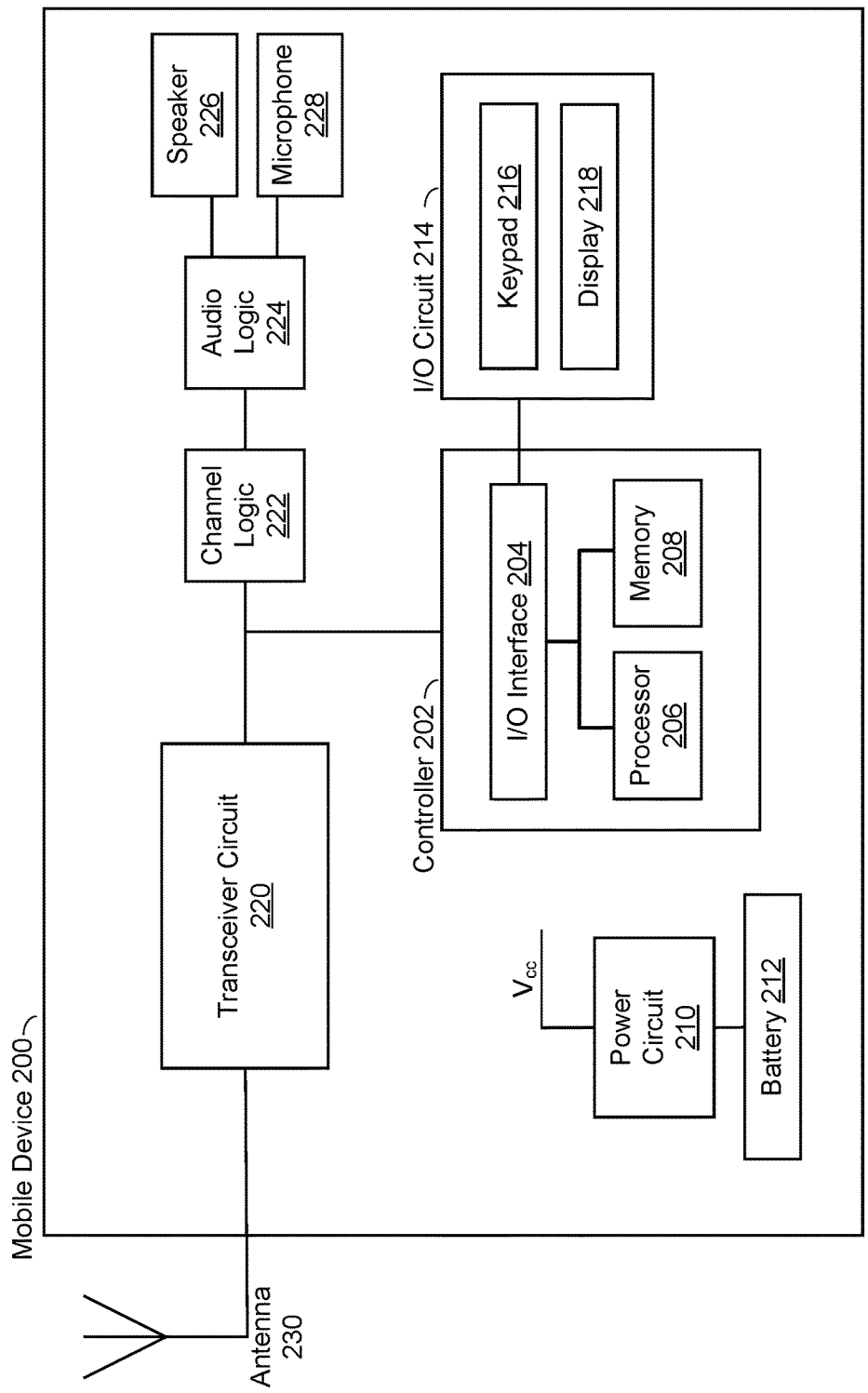
FIG. 2 depicts a block diagram of an example radio device, according to an embodiment of the present disclosure.

FIG. 2 illustrates a circuit block diagram of an example mobile device 200 such as mobile device 106A-106C described above in regard to FIG. 1. As shown in FIG. 2, the mobile device 200 can include a controller 202 configured to control various functions of the mobile device. In certain implementations, the controller 202 can include an input/output (I/O) interface 204, a processor 206, and a memory 208 operably coupled to each other via, for example, a system bus. The mobile device 200 can also include a power circuit 210 operably coupled to a battery 212. In certain implementations, the power circuit 210 can be configured to receive an input voltage from the battery 212 and output a system voltage $V_{cc}$. For example, the battery 212 can be configured to output a 12-volt battery voltage. The power circuit 210 can be configured to receive and condition the battery voltage and output a system voltage $V_{cc}$ at, for example, 5 volts.

The mobile device 200 can further include an I/O circuit 214 that is operably coupled to the I/O interface 204 of controller 202. The I/O circuit 214 can be configured to receive information from a user interface such as a keypad 216 as well as display information to a user using an output device such as display 218. However, it should be noted that the keypad 216 and display 218 are shown by way of example only as input and output devices. In certain implementations, additional and/or alternative input and output devices can be used. For example, a single I/O device can be included such as a touchscreen interface that is configured to both receive input information from a user as well as display output information to the user.

As further shown in FIG. 2, the mobile device 200 can further include a transceiver circuit 220 operably coupled to the controller 202 and configured to process incoming messages received by the mobile device as well as to process outgoing messages. It should be noted that the transceiver circuit 220 is shown by way of example only. In certain implementations, the mobile device 200 can include separate transmission circuitry and receiving circuitry.

The mobile device 200 can further include channel logic 222. In certain implementations, the channel logic 222 can be configured to monitor a particular frequency channel for any incoming messages that are intended for the mobile device 200. For example, the channel logic 222 can act as a frequency tuner for the transceiver circuit 220, providing an indication of what frequency or frequencies the transceiver circuit should monitor for incoming messages and what frequency the transceiver circuit should output messages.

As further shown in FIG. 2, the mobile device can include an audio logic circuit 224 operably coupled to, for example, a speaker 226 and a microphone 228. The audio logic circuit can be configured to receive incoming messages from, for example, the transceiver circuit 220 and decode and configure the received messages for output by, for example, the speaker 226. Similarly, the audio logic circuit 224 can be configured to record audio received by the microphone 228 and configure the recorded audio for transmission by the transceiver circuit 220.

Depending upon the design of the mobile device 200, the housing of the device can include an external antenna 230 that is, for example, operably connected to the transceiver circuit 220. The antenna 230 can be relatively low power compared to, for example, antenna 104 as described above in the discussion of FIG. 1. For example, antenna 230 can be configured to broadcast at about 10 watts.

In certain implementations, the antenna 230 is configured to receive incoming message over a particular frequency range (e.g., between about 136 MHz to about 860 MHz) and provide the incoming messages to the transceiver circuit 220. As noted above, the transceiver circuit 220 can be configured to monitor a particular frequency of interest for messages intended for mobile device 200. Additionally, the antenna 230 can be configured to transmit outgoing messages received from the transceiver circuit 220.

It should be noted that the circuit diagram as provided in FIG. 2 and described herein is provided by way of example only. It is shown to provide a basic understanding of the functionality and internal components of a mobile device such as mobile devices 106A-106C as described above and is not intended to be interpreted as limiting the potential design of a mobile device as described herein. For example, the types of circuit components and arrangement of the components as described in reference to FIG. 2 is by way of example only and can vary depending upon the design and intended use of the mobile device.

DMR Messaging Techniques

As briefly described above, messaging types that exist in commercialized DMR specifications can be used to disable mobile devices, thereby providing for a DOS attack that is targeted to specific mobile devices. By using these message types and sending commands to specific target devices, the techniques as described herein can remotely disable the target device, effectively denying service to that device until the device is enabled or reprogrammed. The message is specifically encoded for the target device, so other devices that may be listening will ignore this message and will not be disabled. In addition, as this technique does not rely upon signal jamming, it can be effective with a lower power output as compared to jamming and from greater distances from the target device.

Figures 3, 4:
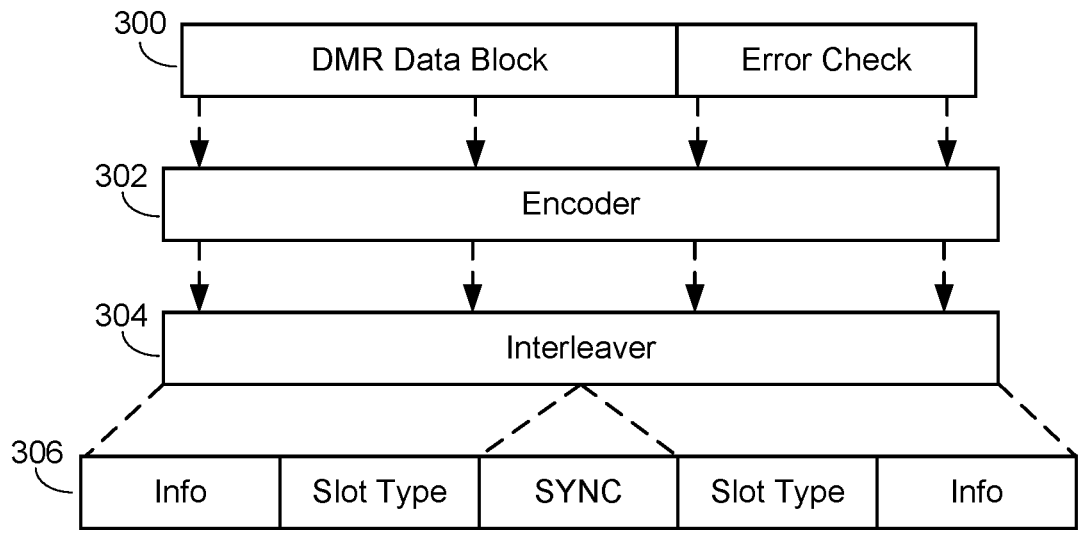
FIG. 3 depicts an example transmission packet structure for a digital mobile radio communications network, in accordance with an embodiment of the present disclosure.
FIG. 4 depicts an example modified transmission packet structure for a digital mobile radio communications network, in accordance with an embodiment of the present disclosure.

DMR communications include a specific messaging structure and timing sequence. For example, FIG. 3 illustrates an example breakdown of a data packet as transmitted in a DMR communication system. As shown in FIG. 3, a DMR data packet as shown in line 300 can include a DMR data block intended for a particular target mobile radio device as well as an error check block. For example, the error check block can include a cyclic redundancy check (CRC) value that can be used by, for example, a target mobile radio device to detect any changes to raw data contained within the DMR data block. However, it should be noted that CRC is shown by way of example only and other error checking functions can be used.

As shown in line 302 of FIG. 3, the DMR data packet can be processed by an encoder such as a block product turbo coding (BPTC) encoder such as BPTC (196,96). The encoder can be configured to provided added security during transmission. As shown in line 304 of FIG. 3, the encoded DMR data packet can be processed by an interleaver to provide signal redundancy for additional error correction during the transmission and receiving of the message. For example, as shown in line 306 of FIG. 3, the transmitted message can be interleaved to have a symmetrical format including an information block, a slot type block (indicating, for example, the type of DRM data packet being transmitted), a synchronization block, another slot type block, and another data block. In certain implementations, the even distribution of data on either side of the synchronization block provides for similar transition times for a device switching from receiving to transmitting and from transmitting back to receiving.

Depending upon the type of data packet being transmitted, the length of the data blocks can vary. In certain implementations, a data block can include a set number of bits depending upon a particular message structure. For example, a DMR standard control signaling block (CSBK) message structure can include an 80-bit data block and a 16-bit error check block. FIG. 4 illustrates an example 80-bit CSBK message structure. As shown in FIG. 4, the block can include various fields such as Last Block, Protect Flag, OpCode, Feature ID, Reserved, Technique, Source ID, and Target ID.

More specifically, the Last Block field can be a 1-bit field that is used to indicate whether the current data block is the last data block in a message. If the data block is the last, the field is set to one. If there are additional data blocks, the field is set to zero. Currently, the Protect Flag field is a 1-bit field that is reserved for future use. The OpCode field is a 6-bit field that is used to indicate a non-standard operational code as described above. For example, the OpCode field can be used to activate or disable various features or functions of a DMR mobile device such as microphone activation. The Feature ID field is an 8-bit field that specifies the manufacturer-specific feature set. For example, the value as included in the Feature ID field determines what function the OpCode field provides. In a particular example, manufacturer A has a Feature ID equal to 25. When a message includes a Feature ID field having a value of 25, the receiving device can access a listing of operational codes associated with manufacturer A. Thus, the device can determine what functionality is provided in the OpCode field by verifying the received OpCode against the manufacturer-specific listing of operational codes.

Referring again to FIG. 4, the Reserved field is an 8-bit filed that is reserved for future use. The Technique field is an 8-bit field that can be used to transmit a device operation instruction such as disable or enable the device. For example, each specific manufacturer can have a numerical value that, when present in the technique field, can be used to disable a DMR mobile device. As noted above, the Feature ID field can be used to identify a manufacturer-specific set of Technique codes and process a received technique code as appropriate.

The Source ID field is a 24-bit field that identifies which DMR device is transmitting the message. Conversely, the Target ID field is a 24-bit field that identifies which DMR device is to receive and process the transmitted message.

Figure 5:
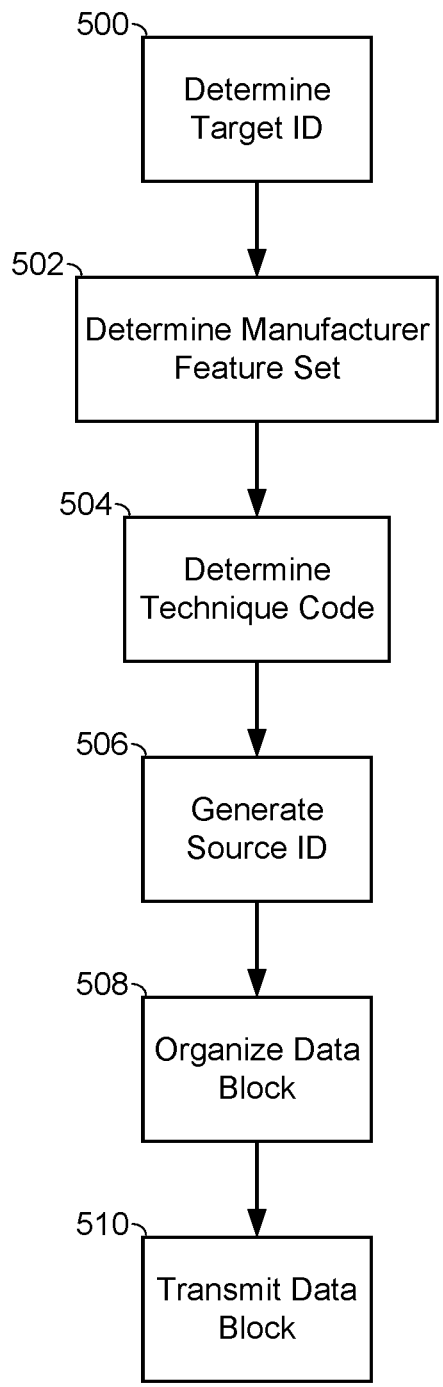
FIG. 5 depicts an example process for generating and transmitting a radio disable message, in accordance with an embodiment of the present disclosure.

As noted, the configuration of the CSBK is standard for all DMR communications. As such, features within the CSBK can be exploited to provide for a DOS attack on one or more DMR radio devices. FIG. 5 illustrates an example process flow for using the structure of the CSBK to transmit a disable signal to one or more target devices.

For example, as shown in FIG. 5, a computing device such as the computing device included and described above in regard to base station 102 can be configured to determine 500 a target identifier or target ID. For example, the target ID can be related to a mobile radio device that the computing device intends on sending a disable signal to in order to initiate a DOS attack. To determine 500 the target ID, the computing device can eavesdrop or otherwise listen to communications being sent to and from the target mobile radio device to determine its target ID.

The computing device can also determine 502 a manufacturer feature set for the target mobile radio device. If the manufacturer of the target mobile radio device is known, the computing device can use that manufacturer's feature set. In the event that the manufacturer of the target mobile radio device is not known, the computing device can determine 502 the most commonly used manufacturer feature set and use that feature set. Based upon the determined manufacturer feature set, the computing device can also determine 504 an associated technique code that corresponds to the disable code in the determined manufacturer feature set. For example, for a particular manufacturer, the disable code may be the binary number that corresponds to the decimal number 127 (e.g., 11111111).

As further shown in FIG. 5, the computing device can generate 506 a source identifier or a source ID. The source ID should be selected so as to not immediately identify the actual identity of the computing device that is generating the disable signal. However, as the source ID can be an important piece of information (e.g., the source ID can be required for transmitting an enable signal as described below in the discussion of FIG. 6), the computing device can generate 506 and record the source ID for later access and possible use.

The computing device can then organize 508 the various data into a data block. As described above, the DMR control signal block format can be used to transmit the disable signal. As noted above, FIG. 4 provides an overview of the CSBK format for use in a DMR communication system. In an example, the Last Block field can be set to one, thereby indicating that the CSBK including the disable signal is the last block in the packet. The Protect Flag can be set to zero as the target mobile radio device will likely not be reading that field as it is reserved for future implementation. The OpCode field can be set to an arbitrary value depending upon any additional functionality that the computing device may want to implement. For example, the computing device can set the OpCode to the binary number for 36 in decimal numbers (e.g., 100100). This OpCode can instruct the target mobile radio device to activate its microphone and transmitter. However, it should be noted that this OpCode is shown by way of example only and the actual OpCode used can vary depending upon the manufacturer and software of the target mobile radio device.

The computing device can set the Feature ID field to reflect the manufacturer feature set as determined above. The computing device can set the Reserved field to zero as the target mobile radio device will likely not be reading that field as it is reserved for future implementation. The computing device can set the Technique field to reflect the disable code as determine above. The computing device can set the Source ID field to reflect the source identifier as generated above and set the Target ID field to include the target identifier as determined above. Thus, in this example, the disable signal data block can include data as represented by TABLE 1 below:

TABLE 1

| Information Element | Length (Bits) | Value |
| --- | --- | --- |
| Last Block | 1 | Set to 1 |
| Protect Flag | 1 | Set to 0 |
| OpCode | 6 | Set to 36 (for example) |
| Feature ID | 8 | Set as Determined Above (502 in FIG. 5) |
| Reserved | 8 | Set to 0 |
| Technique | 8 | Set to 127 as Determined Above (504 in FIG. 5) |
| Source ID | 24 | Set to Generated Value (506 in FIG. 5) |
| Target ID | 24 | Set to Determined Value (500 in FIG. 5) |

Referring back to FIG. 5, the computing device can transmit 510 the disable signal data block to the target mobile radio device. For example, the computing device can cause transmission of the disable signal data block by transferring the data block to, for example, an antenna such as antenna 104 as described above for broadcasting to the target mobile radio device.

It should be noted that the process as shown in FIG. 5 is provided by way of example only and can be modified or otherwise changed based upon known information and the number of target mobile radio devices that are being disabled. For example, rather than send to a single target ID, the computing device as described in relation to FIG. 5 can be configured to broadcast a large number of disable messages to multiple target IDs. For example, the computing device can have a record of all known and friendly target IDs. The computing device can iteratively step through all target IDs, excluding all known friendly target IDs, in an attempt to transmit disable messages to a large number of target mobile radio devices.

Figure 6:
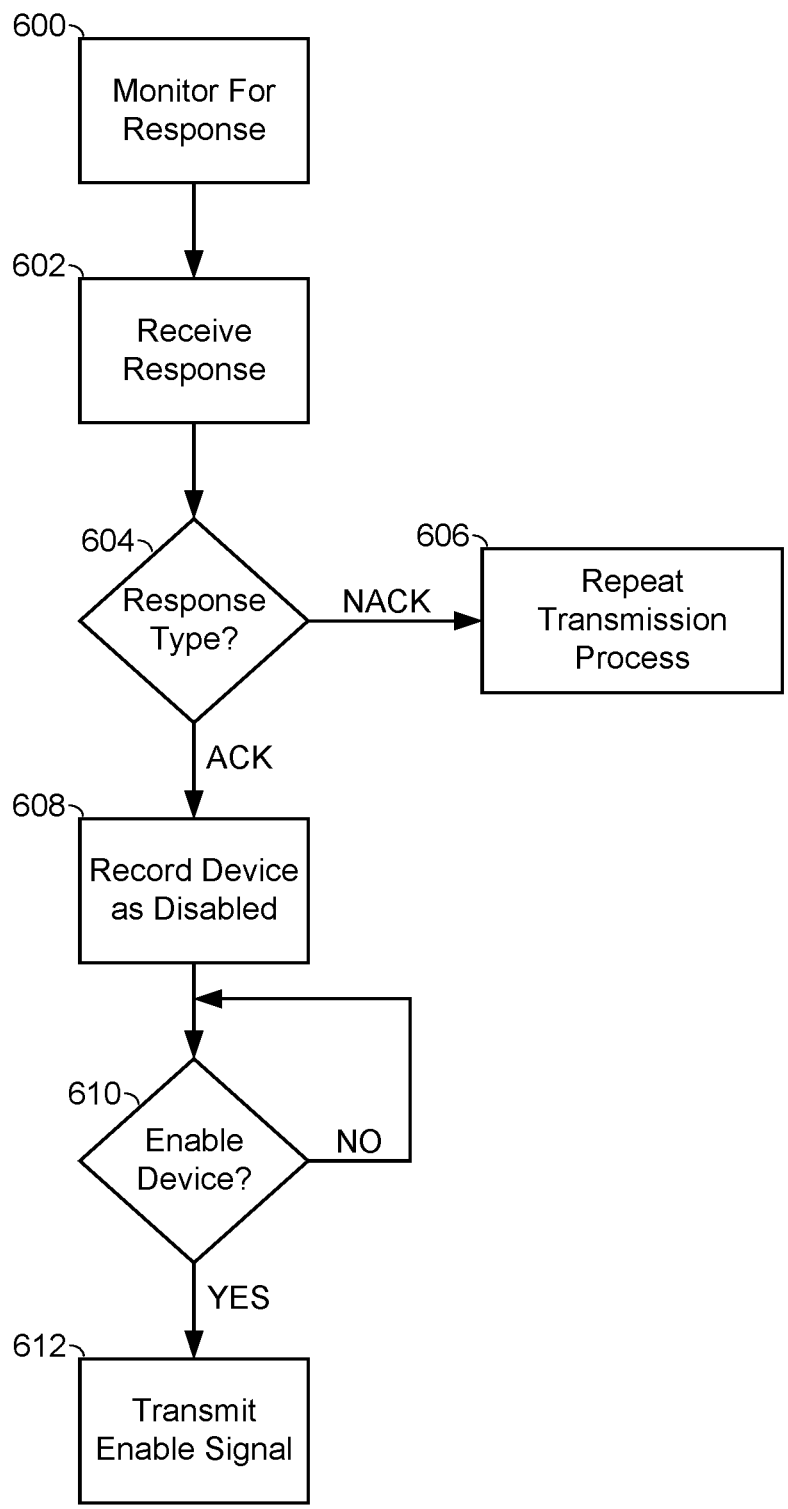
FIG. 6 depicts an example process for receiving a response from a mobile radio device that has been disabled, in accordance with an embodiment of the present disclosure.

FIG. 6 illustrates an example process flow for monitoring for and receiving a response from a mobile radio device that has been sent a disable signal. Upon receipt of a message including a disable signal as described herein, a receiving device typically processes the message including the disable signal and sends out a response message prior to disabling. A computing device, such as the computing device as described above in the discussion of FIG. 5, can be configured to immediately begin monitoring 600 for a response after the message including the disable signal has been transmitted. If the target mobile radio device has received and processed the disable signal, the computing device can receive 602 a response from the target mobile radio device. The computing device can analyze the received response and determine 604 what type of response has been received. For example, the computing device can receive a negative acknowledgement (NACK) signal that indicates the target mobile radio device has not been disabled. For example, the target mobile radio device may include programming that is configured to reject any incoming disable signal. In some implementations, the target mobile radio device can be configured to operate using a different set of manufacturer-specific operational codes than those included in the disable message. As shown in FIG. 6, if the computing device determines 604 that the received message is a NACK signal, the computing device can repeat 606 the transmission process as shown in FIG. 5. In some examples, upon receiving a NACK signal, the computing device can record that the target ID associated with the target mobile radio device that sent the NACK signal is not and/or cannot be disabled.

If, conversely, the computing device determines 606 that the target mobile radio device has responded with an ACK signal, the computing device can record the target mobile radio device as disabled. In certain implementations, at this point in the process flow, the computing device can provide a signal to the target mobile radio device to enable its full transmission and receiving functionality. For example, as shown in FIG. 6, the computing device can determine 610 whether to enable the target mobile radio device. If the computing device does determine 610 that the target mobile radio device is to be re-enabled, the computing device can transmit 612 an enable signal to the target mobile radio device. In certain implementations, in order for the target mobile radio device to process the enable signal, the source ID of the enable signal should match the source ID of the disable signal. In such an example, the enable signal can be nearly identical to the disable signal as described above in the discussion of FIG. 5. However, rather than include the disable code in the technique field as described above, the enable signal can include an enable code in the technique field. To continue the example above, if the disable code is the binary number equal to 127 in decimal numbers, the enable code can be a binary number equal to 126 in decimal numbers (e.g., 11111110). However, it should be noted that the binary number for 126 in decimal numbers is shown as the enable code by way of example only and other enable codes can be used depending upon the manufacturer and programming of the target mobile radio device.

It should also be noted that the process as shown in FIG. 6 is provided by way of example only and can be modified or otherwise changed based upon system implementation. For example, the computing device that is monitoring received messages for a response form the target mobile radio device can be a different computing device from the computing device configured to generate and transmit the disable message as described in the discussion of FIG. 5 above.

Figure 7:
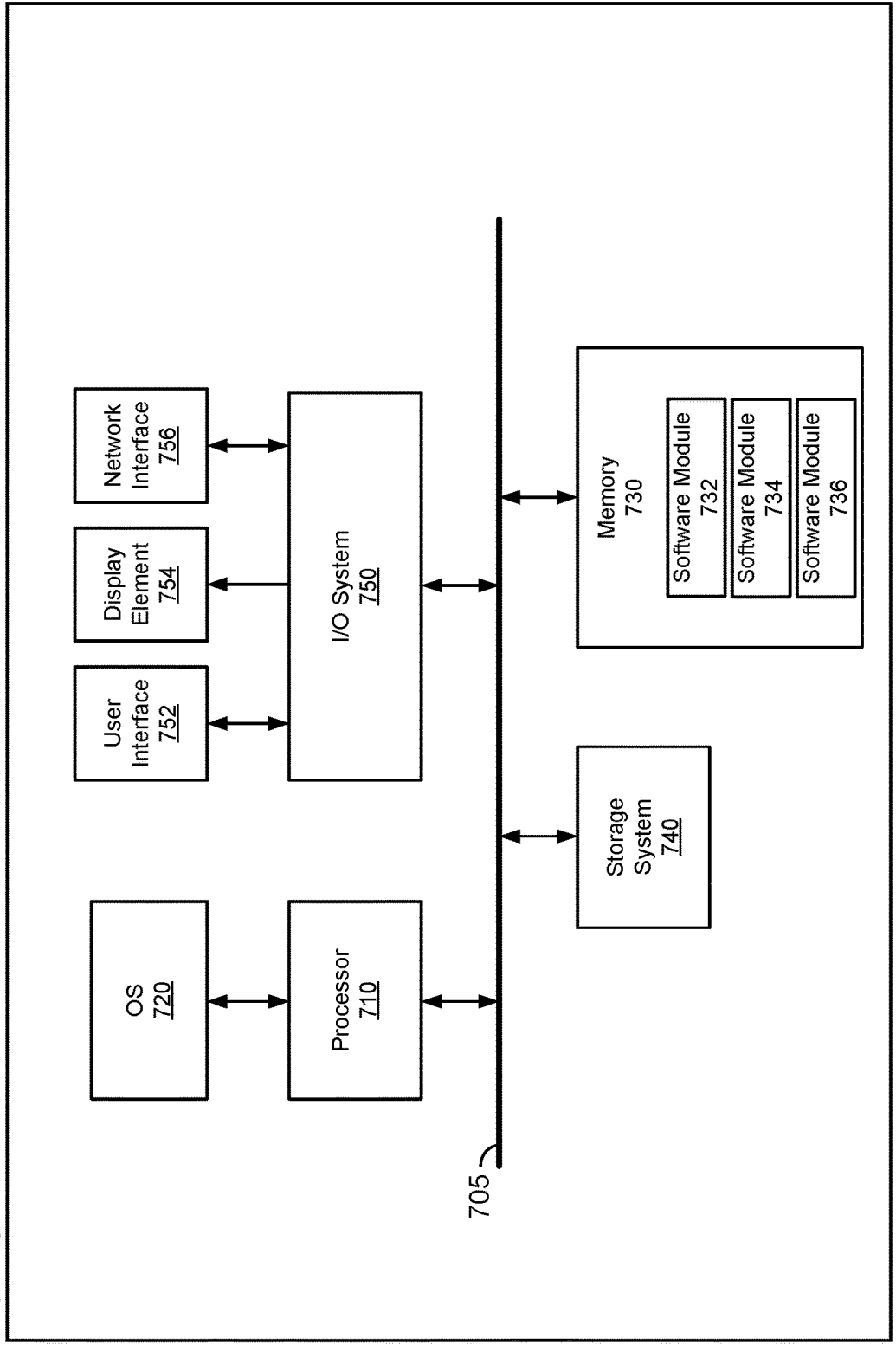
FIG. 7 depicts a block diagram of an example architecture of a computing device, in accordance with an embodiment of present disclosure.

FIG. 7 illustrates a block diagram schematically illustrating a computing device 700, in accordance with certain of the embodiments disclosed herein. For example, computing device 700 can be implemented as the computing device associated with the base station 102 as described above in regard to FIG. 1. Similarly, the computing device 700 can be configured to perform one or more of the processes as described above in regard to FIG. 5 and FIG. 6.

In certain implementations, the computing device 700 can include any combination of a processor 710, a memory 730, a storage system 740, and an input/output (I/O) system 750. As can be further seen, a bus and/or interconnect 705 is also provided to allow for communication between the various components listed above and/or other components not shown. Other componentry and functionality not reflected in the block diagram of FIG. 7 will be apparent in light of this disclosure, and it will be appreciated that other embodiments are not limited to any particular hardware configuration.

The processor 710 can be any suitable processor, and may include one or more coprocessors or controllers, such as an audio processor, a graphics processing unit, or hardware accelerator, to assist in control and processing operations associated with computing device 700. In some embodiments, the processor 710 can be implemented as any number of processor cores. The processor (or processor cores) can be any type of processor, such as, for example, a microprocessor, an embedded processor, a digital signal processor (DSP), a graphics processor (GPU), a network processor, a field programmable gate array or other device configured to execute code. The processors can be multithreaded cores in that they may include more than one hardware thread context (or "logical processor") per core. Processor 710 can be implemented as a complex instruction set computer (CISC) or a reduced instruction set computer (RISC) processor.

In certain implementations, the processor 710 can be configured to execute an Operating System (OS) 720 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing device 700, and therefore may also be implemented using any suitable existing or subsequently-developed platform.

The memory 730 can be implemented using any suitable type of digital storage including, for example, flash memory and/or random-access memory (RAM). In some embodiments, the memory 730 can include various layers of memory hierarchy and/or memory caches as is sometimes done and as will be appreciated. The memory 730 can be implemented as a volatile memory device such as, but not limited to, a RAM, dynamic RAM (DRAM), or static RAM (SRAM) device. The storage system 740 can be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

In certain implementations, the memory 730 can include one or more software modules such as software module 732, software module 734, and software module 736 as shown in FIG. 7. The various software modules can include instructions that, when executed by processor 710, can cause the processor to perform one or more of the process steps and functions as described herein. For example, if computing device 700 represents the computing device as described above in regard to FIG. 5, the various software modules 732, 734, 736 can include instructions for causing the processor 710 to perform the process as shown in FIG. 5 including, for example, causing the processor to determine a target ID, determine a manufacturer feature set, determine a technique code, generate a source ID, organize a data block, and transmit the data block. Similarly, the various software modules 732, 734, 736 can include instructions for causing the processor 710 to perform the process as outlined in FIG. 6 including, for example, monitoring for a response, receiving a response, determining a response type, repeating the transmission process if the response is a NACK, recording the target device as disabled if the response is an ACK, determining whether to enable the target device, and transmitting an enable signal if the target device is to be enabled.

The I/O system 750 can be configured to interface between various I/O devices and other components of the computing device 700. I/O devices may include, but not be limited to, a user interface 752, a display element 754, and a network interface 756.

It will be appreciated that in some embodiments, the various components of computing device 700 can be combined or integrated in a system-on-a-chip (SoC) architecture. In some embodiments, the components may be hardware components, firmware components, software components or any suitable combination of hardware, firmware or software.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments the computing device 700 can include additional, fewer, or alternative subcomponents as compared to those included in the example embodiment of FIG. 7.

FURTHER EXAMPLE EMBODIMENTS

The following examples pertain to further embodiments, from which numerous permutations and configurations will be apparent.

Example 1 includes a system for transmitting a DMR disable signal to a target mobile radio device. The system includes an antenna configured to transmit and receive messages and a base station including at least one computing device communicatively coupled to the antenna. The at least one computing device is configured to generate a first message to be transmitted to a target mobile radio device, the first message comprising a disable signal selected from a list of non-standard operational parameters that can be implemented by the target mobile radio device, cause transmission of the first message via the antenna to the target mobile radio device, and monitor incoming messages received via the antenna for an acknowledgement message from the target mobile radio device that the target mobile radio device has been disabled.

Example 2 includes the subject matter of Example 1, wherein the disable signal is included in a DMR standard control signaling block.

Example 3 includes the subject matter of Example 2, wherein the DMR standard control signaling block further includes at least a target identifier that identifies the target mobile radio device, a source identifier, and a feature set identifier defining a set of operational parameters to be at least partially implemented by the target mobile radio device.

Example 4 includes the subject matter of Example 2 or 3, wherein the at least one computing device is further configured to determine a target identifier that identifies the target mobile radio device and generate a source identifier to be included in the first message to be transmitted to the target mobile radio device.

Example 5 includes the subject matter of any of the preceding Examples, wherein the disable signal is configured to limit transmitting and receiving functionality of the target mobile radio device.

Example 6 includes the subject matter of any of the preceding Examples, wherein the at least one computing device is further configured to generate a second message to be transmitted to the target mobile radio device, the second message including an enable signal, and cause transmission of the second message via the antenna to the target mobile radio device.

Example 7 includes the subject matter of any of the preceding Examples, wherein the list of non-standard operational parameters is stored in firmware of the target mobile radio device.

Example 8 includes a method for transmitting a DMR disable signal to a target mobile radio device. The method includes generating, by a computing device, a first message to be transmitted to a target mobile radio device, the first message comprising a disable signal selected from a list of non-standard operational parameters that can be implemented by the target mobile radio device, causing, by the computing device, an antenna communicatively coupled to the computing device to transmit the first message to the target mobile radio device, and monitoring, by the computing device, incoming messages received via the antenna for an acknowledgement message from the target mobile radio device that the target mobile radio device has been disabled.

Example 9 includes the subject matter of Example 8, wherein the disable signal is included in a DMR standard control signaling block.

Example 10 includes the subject matter of Example 9, wherein the DMR standard control signaling block further comprises at least a target identifier that identifies the target mobile radio device, a source identifier, and a feature set identifier defining a set of operational parameters to be at least partially implemented by the target mobile radio device.

Example 11 includes the subject matter of Example 9 or 10, wherein the method further includes determining, by the computing device, a target identifier that identifies the target mobile radio device and generating, by the computing device, a source identifier to be included in the first message to be transmitted to the target mobile radio device.

Example 12 includes the subject matter of any of Examples 8-11, wherein the disable signal is configured to limit transmitting and receiving functionality of the target mobile radio device.

Example 13 includes the subject matter of any of Examples 8-12, wherein the method further includes generating, by the computing device, a second message to be transmitted to the target mobile radio device, the second message comprising an enable signal and causing, by the computing device, the antenna to transmit the second message to the target mobile radio device.

Example 14 includes the subject matter of any of Examples 8-13, wherein the list of non-standard operational parameters is stored in firmware of the target mobile radio device.

Example 15 includes a computer program product including one or more non-transitory machine-readable mediums encoding instructions that when executed by one or more processors cause a process to be carried out for generating a DMR disable signal to be transmitted to a target mobile radio device. The process includes generating a first message to be transmitted to a target mobile radio device, the first message comprising a disable signal selected from a list of non-standard operational parameters that can be implemented by the target mobile radio device, causing transmission of the first message to the target mobile radio device, and monitoring incoming messages for an acknowledgement message from the target mobile radio device that the target mobile radio device has been disabled.

Example 16 includes the subject matter of Example 15, wherein the disable signal is included in a DMR standard control signaling block.

Example 17 includes the subject matter of Example 16, wherein the DMR standard control signaling block further includes at least a target identifier that identifies the target mobile radio device, a source identifier, and a feature set identifier defining a set of operational parameters to be at least partially implemented by the target mobile radio device.

Example 18 includes the subject matter of Example 16 or 17, wherein the process further comprises determining a target identifier that identifies the target mobile radio device and generating a source identifier to be included in the first message to be transmitted to the target mobile radio device.

Example 19 includes the subject matter of any of Examples 15-18, wherein the disable signal is configured to limit transmitting and receiving functionality of the target mobile radio device.

Example 20 includes the subject matter of any of Examples 15-19, wherein the process further comprises generating a second message to be transmitted to the target mobile radio device, the second message comprising an enable signal and causing the antenna to transmit the second message to the target mobile radio device.

Example 21 includes the subject matter of any of Examples 15-20, wherein the list of non-standard operational parameters is stored in firmware of the target mobile radio device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood in light of this disclosure. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner and may generally include any set of one or more elements as variously disclosed or otherwise demonstrated herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A system for transmitting a digital mobile radio (DMR) disable signal to a target mobile radio device, the system comprising:
   an antenna configured to transmit and receive messages; and
   a base station comprising at least one computing device communicatively coupled to the antenna, the at least one computing device configured to
      identify the target mobile radio device that is intended to be disabled;
      generate a first message to be transmitted to the target mobile radio device in order to initiate a denial of service (DOS) attack, the first message comprising a disable signal selected from a list of non-standard operational parameters that is implemented by the target mobile radio device,
      cause transmission of the first message via the antenna to the target mobile radio device, and
      monitor incoming messages received via the antenna for an acknowledgement message from the target mobile radio device that the target mobile radio device has been disabled, after the first message has been received and processed.

2. The system of claim 1, wherein the disable signal is included in a DMR standard control signaling block to activate or disable features or functions of the target mobile radio device.

3. The system of claim 2, wherein the DMR standard control signaling block further comprises a target identifier that identifies the target mobile radio device, a source identifier, and a feature set identifier defining a set of operational parameters to be at least partially implemented by the target mobile radio device.

4. The system of claim 2, wherein the at least one computing device is further configured to:
   determine a target identifier that identifies the target mobile radio device; and
   generate a source identifier to be included in the first message to be transmitted to the target mobile radio device.

5. The system of claim 1, wherein the disable signal is configured to limit transmitting and receiving functionality of the target mobile radio device denying service to the target mobile radio device until it is enabled or reprogrammed.

6. The system of claim 1, wherein the at least one computing device is further configured to:
   generate a second message to be transmitted to the target mobile radio device, the second message comprising an enable signal; and
   cause transmission of the second message via the antenna to the target mobile radio device.

7. The system of claim 1, wherein the list of non-standard operational parameters is stored in firmware of the target mobile radio device.

8. A method for transmitting a digital mobile radio (DMR) disable signal to a target mobile radio device, the method comprising:
   identifying, by a computing device, the target mobile radio device that is intended to be disabled,
   generating, by the computing device, a first message to be transmitted to the target mobile radio device in order to initiate a denial of service (DOS) attack, the first message comprising a disable signal selected from a list of non-standard operational parameters that is implemented by the target mobile radio device, wherein the first message is encoded for the target mobile radio device,
   causing, by the computing device, an antenna communicatively coupled to the computing device to transmit the first message to the target mobile radio device, and monitoring, by the computing device, incoming messages received via the antenna for an acknowledgement message from the target mobile radio device that the target mobile radio device has been disabled after the first message has been received and processed, wherein the computing device is separate from the target mobile radio device.

9. The method of claim 8, wherein the disable signal is included in a DMR standard control signaling block.

10. The method of claim 9, wherein the DMR standard control signaling block further comprises a target identifier that identifies the target mobile radio device, a source identifier, and a feature set identifier defining a set of operational parameters to be at least partially implemented by the target mobile radio device.

11. The method of claim 9, further comprising:
determining, by the computing device, a target identifier that identifies the target mobile radio device; and
generating, by the computing device, a source identifier to be included in the first message to be transmitted to the target mobile radio device.

12. The method of claim 8, wherein the disable signal is configured to limit transmitting and receiving functionality of the target mobile radio device.

13. The method of claim 8, further comprising:
generating, by the computing device, a second message to be transmitted to the target mobile radio device, the second message comprising an enable signal; and
causing, by the computing device, the antenna to transmit the second message to the target mobile radio device.

14. The method of claim 8, wherein the list of non-standard operational parameters is stored in firmware of the target mobile radio device.

15. A computer program product including one or more non-transitory machine-readable mediums encoding instructions that when executed by one or more processors cause a process to be carried out for generating a digital mobile radio (DMR) disable signal to be transmitted to a target mobile radio device, the process comprising:
identifying, by the one or more processors, the target mobile radio device that is intended to be disabled;
generating, by the one or more processors, a first message to be transmitted to the target mobile radio device in order to initiate a denial of service (DOS) attack, the first message comprising a disable signal selected from a list of non-standard operational parameters that is implemented by the target mobile radio device,
causing, by the one or more processors, transmission of the first message to the target mobile radio device to deny service to the target mobile radio device until it is enabled or reprogrammed; and
monitoring, by the one or more processors, incoming messages for an acknowledgement message from the target mobile radio device that the target mobile radio device has been disabled, after the first message has been received and processed.

16. The computer program product of claim 15, wherein the disable signal is included in a DMR standard control signaling block.

17. The computer program product of claim 16, wherein the DMR standard control signaling block further comprises a target identifier that identifies the target mobile radio device, a source identifier, and a feature set identifier defining a set of operational parameters to be at least partially implemented by the target mobile radio device.

18. The computer program product of claim 16, wherein the process further comprises:
determining a target identifier that identifies the target mobile radio device; and
generating a source identifier to be included in the first message to be transmitted to the target mobile radio device.

19. The computer program product of claim 15, wherein the disable signal is configured to limit transmitting and receiving functionality of the target mobile radio device.

20. The computer program product of claim 15, wherein the process further comprises:
generating a second message to be transmitted to the target mobile radio device, the second message comprising an enable signal; and
causing transmission of the second message to the target mobile radio device.

21. The computer program product of claim 15, wherein the list of non-standard operational parameters is stored in firmware of the target mobile radio device.

* * * * *